United States Patent
Cannon et al.

(10) Patent No.: US 9,678,940 B2
(45) Date of Patent: Jun. 13, 2017

(54) LOCATION/EVENT BASED DICTIONARIES TO FACILITATE COMMUNICATION IN A VIRTUAL WORLD LOCATION

(75) Inventors: Ulysses L. Cannon, Durham, NC (US); Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/177,713

(22) Filed: Jul. 22, 2008

(65) Prior Publication Data

US 2010/0023476 A1    Jan. 28, 2010

(51) Int. Cl.
*G06F 17/30* (2006.01)
*G06F 17/27* (2006.01)

(52) U.S. Cl.
CPC .............. *G06F 17/2735* (2013.01)

(58) Field of Classification Search
CPC .................................. G06F 17/2735
USPC ......................... 707/732, 769, 738
See application file for complete search history.

(56) References Cited

U.S. PATENT DOCUMENTS

| | | | | |
|---|---|---|---|---|
| 6,219,045 B1* | 4/2001 | Leahy | ............ | H04L 65/403 709/204 |
| 6,767,287 B1* | 7/2004 | Mcquaid | ............ | A63F 13/12 463/29 |
| 7,181,690 B1* | 2/2007 | Leahy et al. | ............ | 715/706 |
| 8,026,918 B1* | 9/2011 | Murphy | ............ | G06N 3/006 345/473 |
| 8,078,551 B2* | 12/2011 | Bar | ............ | G06F 17/2765 706/12 |
| 8,442,946 B2* | 5/2013 | Hamilton et al. | ............ | 707/655 |
| 8,692,835 B2* | 4/2014 | Hamilton et al. | ............ | 345/522 |
| 2002/0099533 A1* | 7/2002 | Jaqua | ............ | G06F 17/30669 704/1 |
| 2004/0111479 A1* | 6/2004 | Borden et al. | ............ | 709/206 |
| 2004/0179039 A1* | 9/2004 | Blattner et al. | ............ | 345/758 |
| 2007/0016625 A1* | 1/2007 | Berstis | ............ | 707/200 |
| 2007/0050716 A1* | 3/2007 | Leahy | ............ | A63F 13/358 715/706 |
| 2007/0294129 A1* | 12/2007 | Froseth et al. | ............ | 705/10 |
| 2008/0209312 A1* | 8/2008 | Ardiri | ............ | 715/236 |

(Continued)

OTHER PUBLICATIONS

White, Second Life: A guide to Your virtual word, Aug. 2007, Que Publishing.*
World of Warcraft, 2004, Blizzard Entertainment.*

*Primary Examiner* — Jean M Corrielus
(74) *Attorney, Agent, or Firm* — Steven M. Greenberg, Esq.; CRGO Law

(57) ABSTRACT

Embodiments of the present invention address deficiencies of the art in respect to jargon usage in a location in a virtual world and provide a method, system and computer program product for location and event based dictionaries to facilitate communication in location in a virtual world. In an embodiment of the invention, a method for communication facilitation in a location within the virtual world can include identifying jargon in a message exchanged in a location in a virtual world, looking up a glossary entry for the jargon in a dictionary of jargon for the location in the virtual world, and rendering the glossary entry in connection with the jargon in the message.

19 Claims, 1 Drawing Sheet

(56) References Cited

U.S. PATENT DOCUMENTS

| | | | |
|---|---|---|---|
| 2009/0089238 A1* | 4/2009 | Stevenson-Perez | G06N 5/022 706/50 |
| 2009/0157382 A1* | 6/2009 | Bar | G06F 17/2765 704/8 |
| 2009/0209236 A1* | 8/2009 | Bloebaum | G06N 3/006 455/414.1 |
| 2009/0267938 A1* | 10/2009 | Nicol et al. | 345/419 |
| 2009/0276718 A1* | 11/2009 | Dawson et al. | 715/753 |
| 2009/0288002 A1* | 11/2009 | Hamilton et al. | 715/706 |

\* cited by examiner

LOCATION/EVENT BASED DICTIONARIES TO FACILITATE COMMUNICATION IN A VIRTUAL WORLD LOCATION

BACKGROUND OF THE INVENTION

Field of the Invention

The present invention relates to virtual world management over a computer communications network and more particularly to term usage in a virtual world.

Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

The virtual world mimics real life where different groups of people converge in a location to form an organizational relationship revolving around a particular interest, for instance familial interests, industrial interests, hobby interests, or religious interests to name a few. Each organizational relationship, as it will be understood, demonstrates a specific organizational culture. Jargon is an aspect of any organizational culture in that terminology common to the organizational culture may also be unique to that organizational culture, but foreign to those not involved in the organizational culture.

A common example is that of the corporate environment where terms commonly used in the corporate environment may be terms only familiar to those belonging to the corporate environment—especially in the case of often used acronyms within the corporate environment. In the context of the virtual world, the problem is the same. Unfamiliar participants to a location in virtual world specific to a particular organization likely will encounter jargon readily understood only by those familiar with the organizational relationship central to the location. As such, communication and especially comprehension of communication within the location of the virtual world can be inhibited leaving the unfamiliar participants puzzled as to the use of specific acronyms or other jargon within the location.

BRIEF SUMMARY OF THE INVENTION

Embodiments of the present invention address deficiencies of the art in respect to jargon usage in a location in a virtual world and provide a novel and non-obvious method, system and computer program product for location and event based dictionaries to facilitate communication in location in a virtual world. In an embodiment of the invention, a method for communication facilitation in a location within the virtual world can include identifying jargon in a message exchanged in a location in a virtual world, looking up a glossary entry for the jargon in a dictionary of jargon for the location in the virtual world, and rendering the glossary entry in connection with the jargon in the message.

In one aspect of the embodiment, identifying jargon in a message exchanged in a location in a virtual world can include comparing words in the message to jargon in the dictionary to detect a match. For example, identifying jargon in a message exchanged in a location in a virtual world can include parsing the message into words and comparing the words to jargon in the dictionary to detect a match. In another aspect of the embodiment, rendering the glossary entry in connection with the jargon in the message can include emphasizing the jargon in the message, activating the emphasized jargon to respond to a user selection, and rendering a pop-up box with the glossary entry responsive to a user selection of the emphasized jargon. Alternatively, rendering the glossary entry in connection with the jargon in the message can include emphasizing the jargon in the message, activating the emphasized jargon to respond to a user selection, and rendering a pop-up box with the glossary entry responsive to a mouse over event in connection with the emphasized jargon.

In another embodiment of the invention, a virtual world management data processing system can include a virtual world server executing in a host computing platform and creating and managing multiple different locations for a virtual world in which different avatars of the virtual world exchange messages. The system also can include a dictionary of jargon coupled to the virtual world server. In this regard, the dictionary can include entries specific to a location and each of the entries can include jargon and a corresponding explanation of a meaning of the jargon. Finally, the system can include jargon management logic coupled both to the dictionary and the virtual world server. The logic can include program code enabled to identify jargon in a message exchanged in one of the locations of the virtual world, to look up a glossary entry for the jargon in the dictionary, and to render the glossary entry in connection with the jargon in the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for communication facilitation in a location within the virtual world. In accordance with an embodiment of the present invention, a dictionary can be established for jargon particular to a location in a virtual world. Subsequently, jargon can be identified in textual messages exchanged between avatars in the location or even between avatars in the location and external parties. For example, the jargon can include acronyms customary for an organizational relationship characteristic of the location. The identified jargon can be located in the dictionary to retrieve a corresponding glossary entry for the jargon. Consequently, jargon in the message can be configured for activation responsive to which an explanation of the meaning of the activated jargon can be provided as set forth in the glossary entry. In this way, a user interacting with an avatar in the location can readily understand jargon specific to the location even though the user may not be familiar with the organizational relationship central to the location.

Figure 1:
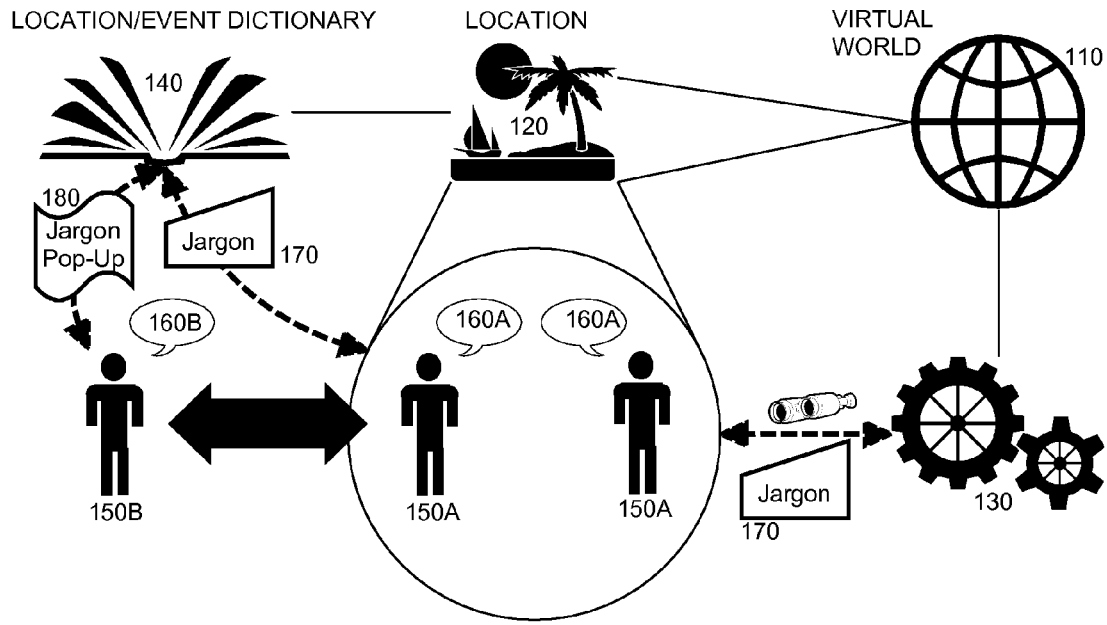
FIG. 1 is a pictorial illustration of a virtual world configured with a location/event based dictionary to facilitate communication in a location within the virtual world.

In further illustration, FIG. 1 pictorially shows a virtual world configured with a location/event based dictionary to facilitate communication in a location within the virtual world. As shown in FIG. 1, a virtual world 110 can be provided to include multiple different locations 120 in which different avatars 150A can interact through the exchange of messages 160A, for instance chat messages or instant messaging messages. (Only a single location shown for ease of illustration). Additionally, external avatars 150B externally positioned to the location 120 can interact through the exchange of messages 160B.

A dictionary 140 can be provided for the location 120. The dictionary 140 can include a glossary of jargon including acronyms and corresponding definitions, synonyms, or both. Further, jargon management logic 130 further can be provided for use in the virtual world 110 such that the messages 160A, 160B exchanged between avatars 150A internal to the location 120, and also messages 160B exchanged between avatars 150A, 150B external and internal to the location 120 can be monitored for jargon 170. Upon identifying jargon in a message 160A, 160B, the dictionary 140 can be searched for the jargon 170 and the jargon 170 within the message 160A, 160B can be activated to show a corresponding entry in the dictionary 140, for example a definition or synonym. In this regard, the jargon 170 can be activated within the message 160A, 160B so that upon activation, a pop-up 180 can be displayed in connection with the jargon 170 to show the corresponding entry in the dictionary 140.

Figures 2, 3:
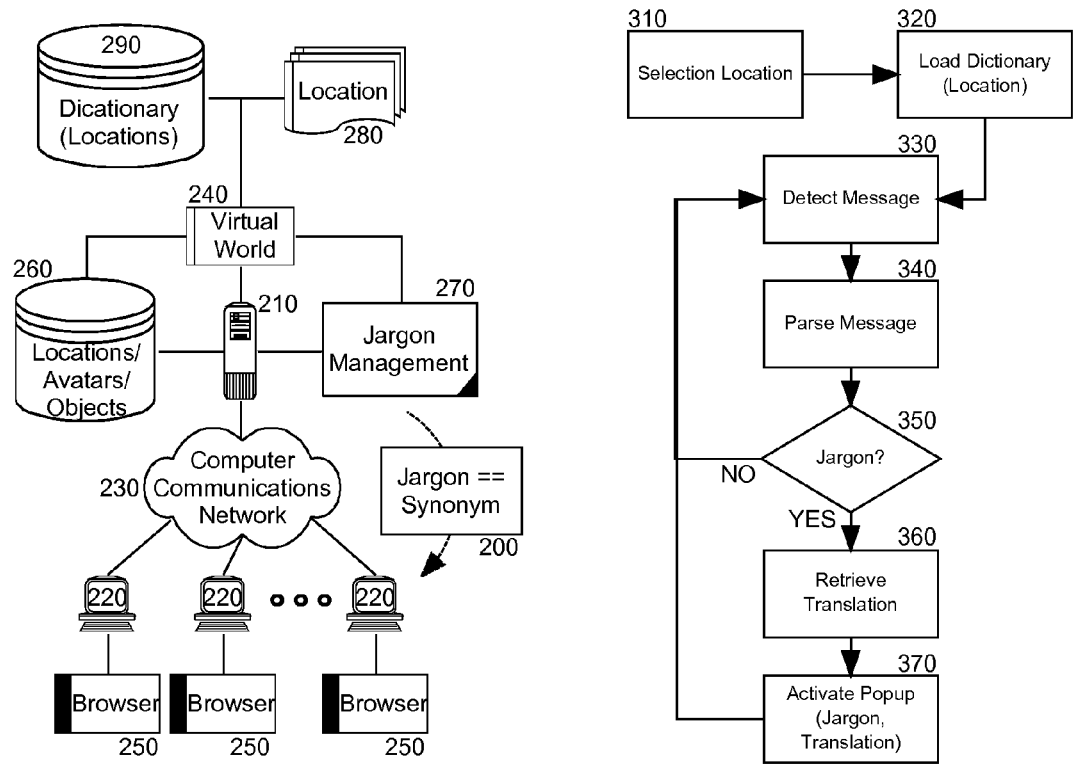
FIG. 2 is a schematic illustration of a virtual world management data processing system configured with a location/event based dictionary to facilitate communication in a location within the virtual world; and, FIG. 3 is a flow chart illustrating a process for communication facilitation in a location within the virtual world.

The process described in connection with FIG. 1 can be implemented within a virtual world management data processing system. In further illustration, FIG. 2 is a schematic illustration of a virtual world management data processing system configured with a location/event based dictionary to facilitate communication in a location within the virtual world. The system can include a host computing platform 210 configured for coupling to one or more computing clients 220 over computer communications network 240. The host computing platform 210 can support the operation of a virtual world server 240 coupled to a data store of locations, avatars and objects 260. The virtual world server 240 can be configured to creation and manage a virtual world in which different locations 280 can be created within which participants to each location 280 can interact with respective avatars through content browsers 250 coupled to corresponding ones of the computing clients 220.

Notably, jargon management logic 270 can be coupled to the virtual world server 240 through the host computing platform 210. In this regard, the jargon management logic 270 can be included as part of the virtual world server 240, or as an external, remote service accessible to the virtual world server 240. Additionally, a dictionary 290 can be coupled to the virtual world server 240 in which one or more jargon glossaries, each specific to a particular one of the locations 280 can be stored.

The jargon management logic 270 can include program code enabled to identify jargon within messages exchanged between avatars in a particular one of the locations 280 and also with avatars external to the particular one of the locations 280. The program further can be enabled to locate within the dictionary 290 a glossary entry for the jargon for the particular one of the locations 280. The program code yet further can be enabled to display the located glossary entry in connection with the identified jargon in a corresponding message. In this way, one unfamiliar with the jargon, but interacting with avatars in the particular one of the locations 280 can readily understand the meaning of the jargon.

In even further illustration of the operation of the jargon management logic 270, FIG. 3 is a flow chart illustrating a process for communication facilitation in a location within the virtual world. Beginning in block 310, a location in a virtual world can be selected and a dictionary can be loaded for the location in block 320. In block 330, a message can be detected in the location, whether exchanged between avatars in the location, or provided by an avatar external to the location to an avatar in the location. Thereafter, jargon can be identified in the message. For example, the message can be parsed in block 340 to identify the use of jargon associated with an organizational relationship implicit for the location. In decision block 350, if jargon is identified in the message, in block 360 a glossary entry for the jargon can be retrieved from the dictionary for the location. Finally, in block 370, a pop-up can be activated in connection with the jargon in the message. For example, the jargon in the message can be activated such that a mouse-click results in the rendering of a pop-up box with a textual representation of the glossary entry for the jargon.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for communication facilitation in a location within a virtual world, the method comprising:
   providing in a computer a virtual world including multiple different locations in which different avatars interact through an exchange of messages;
   identifying jargon including acronyms for an organizational relationship characteristic of a particular one of the different locations in one of the messages the jargon being terminology common to an organizational culture specific to the particular one of the locations in the virtual world, but foreign to others of the participants not belonging to the organizational culture specific to the particular one of the locations in the virtual world; and,
   responding to a selection of a word in the one of the messages by determining if the selected word is jargon and if so, looking up a glossary entry for the jargon of the selected word, emphasizing the jargon of the selected word from other text in the one of the messages upon finding the glossary entry for the jargon of the selected word in the dictionary of jargon and rendering the glossary entry in the one of the messages in connection with the emphasized jargon.

2. The method of claim 1, wherein identifying jargon comprises comparing words in the message to jargon in the dictionary of jargon to detect a match.

3. The method of claim 1, wherein identifying jargon comprises:
   parsing the message into words; and,
   comparing the words to jargon in the dictionary of jargon to detect a match.

4. The method of claim 1, wherein rendering the glossary entry comprises:
   rendering a pop-up box with the glossary entry in connection with the one of the messages.

5. The method of claim 1, wherein rendering the glossary entry comprises:
   rendering a pop-up box with the glossary entry in connection with the one of the messages responsive to a mouse over event associated with the selected word.

6. The method of claim 1, wherein emphasizing the jargon comprises:
   activating the emphasized jargon in the one of the messages to respond to the selection of the word; and,
   displaying the activated emphasized jargon in the one of the messages.

7. The method of claim 1, wherein the message exchanged between participants is an instant message.

8. A virtual world management data processing system comprising:
   a virtual world server executing in a memory of a host computing platform and creating and managing multiple different locations for a virtual world that provides a computer-based simulated environment in which participants interact with one another through three-dimensional visually displayable surrogates referred to as avatar;
   a dictionary of jargon coupled to the virtual world server, the dictionary of jargon comprising entries specific to a location in the virtual world simulating a real world location, each of the entries comprising jargon and a corresponding explanation of a meaning of the jargon, wherein the jargon is defined as terminology common to an organizational culture specific to the location in the virtual world, but foreign to the participants not involved in the organizational culture; and,
   jargon management logic executing in a memory of a computing device and coupled both to the dictionary of jargon and the virtual world server, the jargon management logic comprising program code enabled to identify jargon including acronyms for an organizational relationship characteristic of a particular one of the different locations in one of the messages, and to respond to a selection of a word in the one of the messages by determining if the selected word is jargon and if so, to look up a glossary entry for the jargon of the selected word, to emphasize the jargon of the selected word from other text in the one of the messages upon finding the glossary entry for the jargon of the selected word in the dictionary of jargon, and to render the glossary entry in the one of the message messages in connection with the emphasized jargon.

9. The system of claim 8, wherein the jargon management logic is included as part of the virtual world server.

10. The system of claim 8, wherein the jargon management logic executing in the memory of the computing device is a remote service accessible by the virtual world server.

11. The system of claim 8, wherein the computing device is the host computing platform and the jargon management logic executes in the memory of the host computing platform.

12. The system of claim 8, wherein the message exchanged between participants is an instant message.

13. A computer program product comprising a non-transitory computer usable storage medium embodying computer usable program code for communication facilitation in a location within a virtual world, the computer program product comprising:
    computer usable program code for providing in a computer a virtual world including multiple different locations in which different avatars interact through an exchange of messages;
    computer usable program code for identifying jargon including acronyms for an organizational relationship characteristic of a particular one of the different locations in one of the messages the jargon being terminology common to an organizational culture specific to the particular one of the locations in the virtual world, but foreign to others of the participants not belonging to the organizational culture specific to the particular one of the locations in the virtual world; and,
    computer usable program code for responding to a selection of a word in the one of the messages by determining if the selected word is jargon and if so, looking up a glossary entry for the jargon of the selected word, emphasizing the jargon of the selected word from other text in the one of the messages upon finding the glossary entry for the jargon of the selected word in the dictionary of jargon and rendering the glossary entry in the one of the messages in connection with the emphasized jargon.

14. The computer program product of claim 13, wherein the computer usable program code for identifying jargon comprises computer usable program code for comparing words in the message to jargon in the dictionary of jargon to detect a match.

15. The computer program product of claim 13, wherein the computer usable program code for identifying jargon comprises:
    computer usable program code for parsing the message into words; and,
    computer usable program code for comparing the words to jargon in the dictionary of jargon to detect a match.

16. The computer program product of claim 13, wherein the computer usable program code for rendering the glossary entry comprises:
    computer usable program code for rendering a pop-up box with the glossary entry in connection with the one of the messages.

17. The computer program product of claim 13, wherein the computer usable program code for rendering the glossary entry comprises:
    computer usable program code for rendering a pop-up box with the glossary entry in connection with the one of the messages responsive to a mouse over event associated with the selected word.

18. The computer program product of claim 13, wherein the computer usable program code for emphasizing the jargon comprises:
    computer usable program code for activating the emphasized jargon in the one of the messages to respond to the selection of the word; and,
    computer usable program code for displaying the activated emphasized jargon in the one of the messages.

19. The computer program product of claim 13, wherein the message exchanged between participants is an instant message.

* * * * *